United States Patent [19]

Kodaira

[11] Patent Number: 5,505,547
[45] Date of Patent: Apr. 9, 1996

[54] SUPPORT STRUCTURE FOR POWER STEERING DRIVE AND MANUFACTURING METHOD THEREOF

[75] Inventor: Tadao Kodaira, Maebashi, Japan

[73] Assignee: Mutsuba Electric Mgf. Co., Ltd., Kiryu, Japan

[21] Appl. No.: 413,610

[22] Filed: Mar. 30, 1995

[30] Foreign Application Priority Data

Apr. 5, 1994 [JP] Japan ................................. 6-067499

[51] Int. Cl.$^6$ ........................................... F16C 19/08
[52] U.S. Cl. ........................ 384/537; 384/551; 384/585
[58] Field of Search .............................. 384/537, 585, 384/551, 584, 510, 559

[56] References Cited

U.S. PATENT DOCUMENTS 3,848,939  11/1974  Pitner ................................... 384/585
4,056,291  11/1977  Kraft et al. .......................... 384/537
5,085,518  2/1992   Langouet ............................ 384/537
5,439,298  8/1995   Zernickel et al. ................. 384/537

Primary Examiner—Lenard A. Footland
Attorney, Agent, or Firm—Darby & Darby

[57] ABSTRACT

A supporting structure for a drive shaft of an electrically driven power steering motor is presented to prevent axial displacement of the drive shaft. Around the entire peripheral outer circumference of a hollow cylindrical drive shaft, a radially protruding flange section of a U-shaped cross section is provided to engage with the shaft bearing freely rotatably supporting the drive shaft, and prevent an axial displacement of the drive shaft. The support structure exhibits little deformation due to spring back, because of the improved resistance to axial loading and retains excellent original shape of the flange section.

9 Claims, 3 Drawing Sheets

SUPPORT STRUCTURE FOR POWER STEERING DRIVE AND MANUFACTURING METHOD THEREOF

BACKGROUND OF THE INVENTION

1. Field of the Invention

The present invention relates in general to a support structure for a rotation shaft for automotive power steering, and relates in particular to a simple support structure which provides a firm engagement with the shaft to prevent an axial displacement of the shaft.

2. Technical Background

Power steering has become increasingly common for automobiles providing assistance to the steering effort required to turn the wheels of an automobile. The power steering mechanisms can be driven with either hydraulic or electrical device. Electrical motor driven systems are disclosed, for example, in a Japanese Utility Application, First Publication, H-4-54459 or a Japanese Utility Application, Second Publication, H5-44576.

FIG. 4 shows an example of the structural details of a drive unit in a rack and pinion steering system. The rack and pinion type driving system shown in FIG. 4 has a rack member 1 having ball grooves 2 for ball screws formed on a section of the outer surface, and each end of the rack member 1 is attached to a tie-rod (not shown) connected to a knuckle for rotational supporting of the tire wheels. The ball grooves 2 are fitted with a ball screw nut 3 which is joined with a flange to a hollow motor rotation shaft 5 of a drive motor 4.

The steering system presented above is driven by powering the drive motor 4 electrically to rotate the motor rotation shaft 5, thereby rotating the ball screw nut 3 as a unit, and reciprocating the rack member 1 to left or right to change the direction of the wheels to alter the direction of travel of the automobile.

One end of the motor rotation shaft 5 (left end in FIG. 4) is freely rotatably supported by a bearing 8 firmly installed in a housing 7 which in turn is fixed to a cylindrical yoke 6. The opposite end of the motor rotation shaft 5 (right end in FIG. 4) is freely rotatably supported, by way of the ball screw nut 3, by a bearing 10 fixed in a housing 9 fixed to a yoke 6. In other words, The motor rotation shaft 5 and the ball screw nut 3 as a unit are freely rotatably supported by the yoke 6 with its associated housings 7, 9 through the bearings 8, 10. The rack member 1 and the ball screw nut 3 are disposed coaxially within the yoke 6.

A flange 3a formed on the ball screw nut 3 has a spacer 11 abutting thereto, and male threads 3b formed on the outer periphery of the ball screw nut 3 has a stopper member 12 screwed thereto. The spacer 11 and the stopper member 12 clamp the inner race of the bearing 10, and this configuration is designed to prevent the ball screw nut 3 and the motor rotation shaft 5 to displace in the axial direction even if the rack member 1 is subjected to an external axial force from the reaction of the tires against the road.

The steering system of the structure presented above requirs machining of male threads 3b on the screw nut 3 as well as components, such as the stopper member 12 to engage with the male threads 3b and the spacer 11 to clamp the bearing 10 in conjunction with the stopper member 12 to prevent the axial displacement of the motor rotation shaft 5. Therefore, not only the machining requirement of the ball screw nut 3 becomes complex, but the number of components needed for the steering system increases. Such a production process is cumbersome to manage.

Furthermore, the structure leaves some concern that the simple screw attachment of the stopper member 12 on the male threads 3b of the ball screw nut 3 may not be sufficient to prevent stretching of the stopper member 12 if the motor rotation shaft 5 should be loaded in the axial direction. One method for preventing the stopper member 12 from becoming loose is to provide a locking key. However, such an approach requires not only an additional step of machining of a seating groove extending in the axial direction but also fabrication of the locking key to engage with the seating groove and the stopper member. Therefore, this approach further increases the number of components required for the steering system. This problem is not limited to the case of attaching the ball screw nut 3 to the bearing 10, and the same problem occurs when attaching the motor rotation shaft 5 directly to the bearing 8.

To summarize the problems presented above, because the structural configuration of the driving system for power steering requires that male threads and grooves must be provided on the motor rotation shaft or ball screw nut, therefore, the manufacturing process for the steering system is not only complex and cumbersome, but demands handling of increased number of components required for the system. Further, to prevent loosening of the nut members, it is important that the components parts be manufactured with high precision, and tightening torque be carefully monitored. The ultimate result is that the conventional design for the support structure for power steering requires complex methods of preventing the axial displacement of the motor rotation shaft, and leads to high cost of manufacturing of the power steering system.

SUMMARY OF THE INVENTION

The objective of the present invention is to present a relatively simple support structure for a motor rotation shaft for a rack and pinion type power steering system, which is relatively easy to manufacture and provides a firm engagement with the shaft bearing which freely rotatably supports the motor rotation shaft even when an external force is applied in the axial direction.

The support structure for motor rotation shaft comprises: a motor rotation shaft; a flange section having a U-shaped cross section protruding outward radially, and integrally formed as an end assembly of the motor rotation shaft; and a shaft bearing for freely rotatably supporting the motor rotation shaft; wherein the flange section engages with the motor rotation shaft so as to prevent an axial displacement of the motor rotation shaft-with respect to the shaft bearing.

The support structure presented above includes a flange section of a U-shape constituted by vertical side walls on both sides and an arcuate section joining the peripheries of the vertical walls. Even if an axial force is applied to the motor rotation shaft to deform both vertical walls, the arcuate section joining the vertical walls provides resistance to the deforming force. This configuration is superior to simple vertical walls having an enlarged diameter, and offers an increased resistance to the deforming force and superior ability for shape retention.

Further, the arcuate section is produced by folding bend of the thin-walled section of the motor rotation shaft, which imparts sufficient work hardening to reinforce the strength of the vertical sections, so that even if a large axial force is applied to the motor rotation shaft to transmit a deformation force to the vertical walls, the vertical walls are not easily deformed.

The method of making the support structure of the present invention comprises the steps of: forming a thin-walled section circumferentially on an inner end surface of a cylindrical starting material, so that a wall thickness of the thin-walled section is thinner than a wall thickness of general parts of the starting material; compressing the starting material axially so as to collapse the thin-walled section to produce a flange section having a U-shaped cross section protruding outward radially along a circumference of the thin-walled section.

The method of making the support structure includes a step of making a thin-walled section on the motor rotation shaft and thus presents an easy method of making a U-shaped flange section which protrudes outward radially, by collapsing the thin-walled section through an application of an axial compressive force to the starting material.

DETAILED DESCRIPTION OF THE PREFERRED EMBODIMENTS

Figure 1:
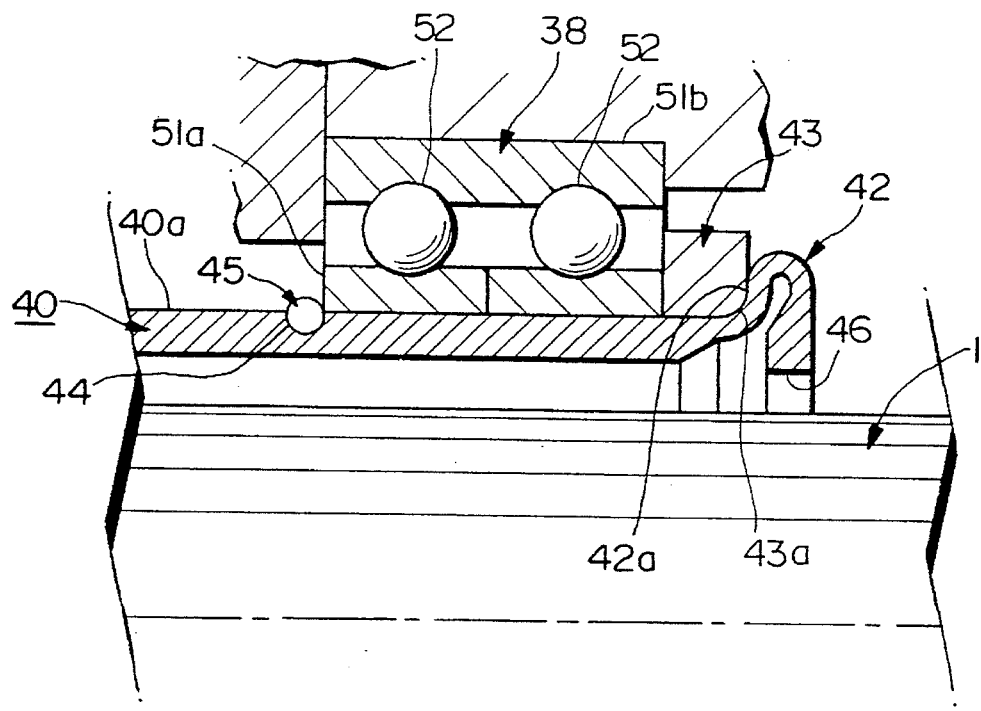
FIG. 1 is a through-center cross sectional view of the essential parts of a first embodiment of the support structure for a motor rotation shaft.

A first embodiment of the support structure for motor rotation shaft will be explained with reference to FIGS. 1 to 3. The motor rotation shaft of this embodiment is applicable to a rack and pinion type steering assembly, and FIG. 1 shows a through-center cross sectional view of the essential parts of the support structure for the motor rotation shaft, FIG. 2 shows an example of the manufacturing process of the motor rotation shaft and FIG. 3 shows an overall structure of the support structure for the motor rotation shaft shown in FIG. 1.

The overall construction of the motor rotation shaft will be explained with reference to FIG. 3. The drive motor 30 comprises: a cylindrical yoke 31; a magnet 32 provided on the inner surface of the yoke 31; a hollow cylindrical motor rotation shaft 40 inserted in and disposed coaxially with the yoke 31; a coil 34 disposed on the outer surface of the motor rotation shaft 40 so as to oppose the magnet 32; commutators 35 electrically connected to the coil 34; and brushes 36 in electrical contact with the commutators 35. A ring-shaped housing 37 is attached to the flange of the yoke 31 with bolts 50, seen on the right in FIG. 3, and a shaft bearing 38 is fitted on the inside of the housing 37. The shaft bearing 38 is a so-called ball bearing comprising a cage (not shown) holding a plurality of balls 52 between an inner race 51a and an outer race 51b which rotate relative to each other. One end of the motor rotation shaft 40 is freely rotatably supported by the housing 37 by way of the shaft bearing 38. The opposite end of the motor rotation shaft 40, is attached to the flange of a ball screw nut (on the left side in FIG. 3, not shown) which is freely rotatably supported by the yoke 31 by way of a bearing similar to the shaft bearing 38.

Figure 3:
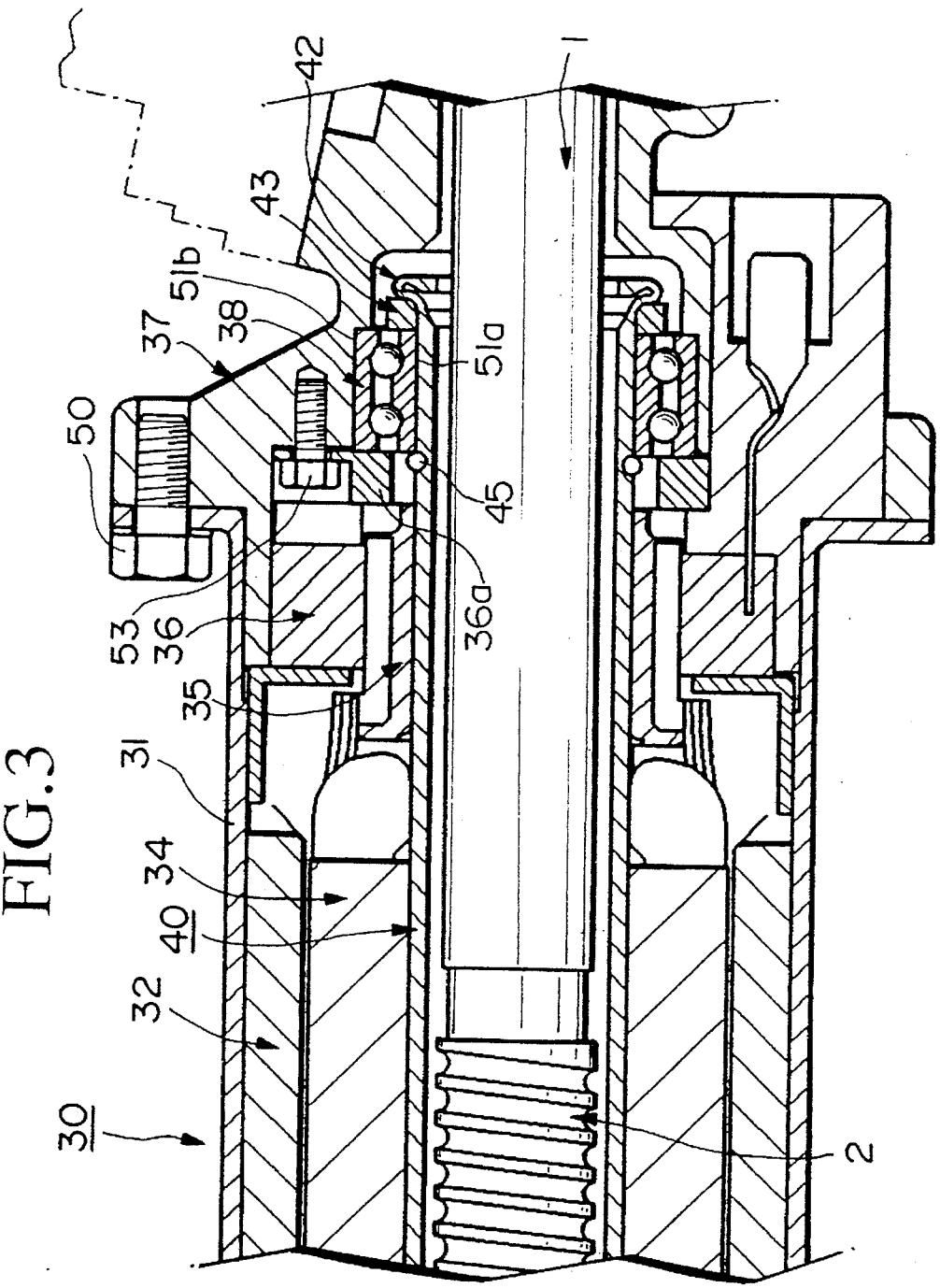
FIG. 3 is a cross sectional view of the support structure for the motor rotation shaft shown in FIG. 1.
Figure 4:
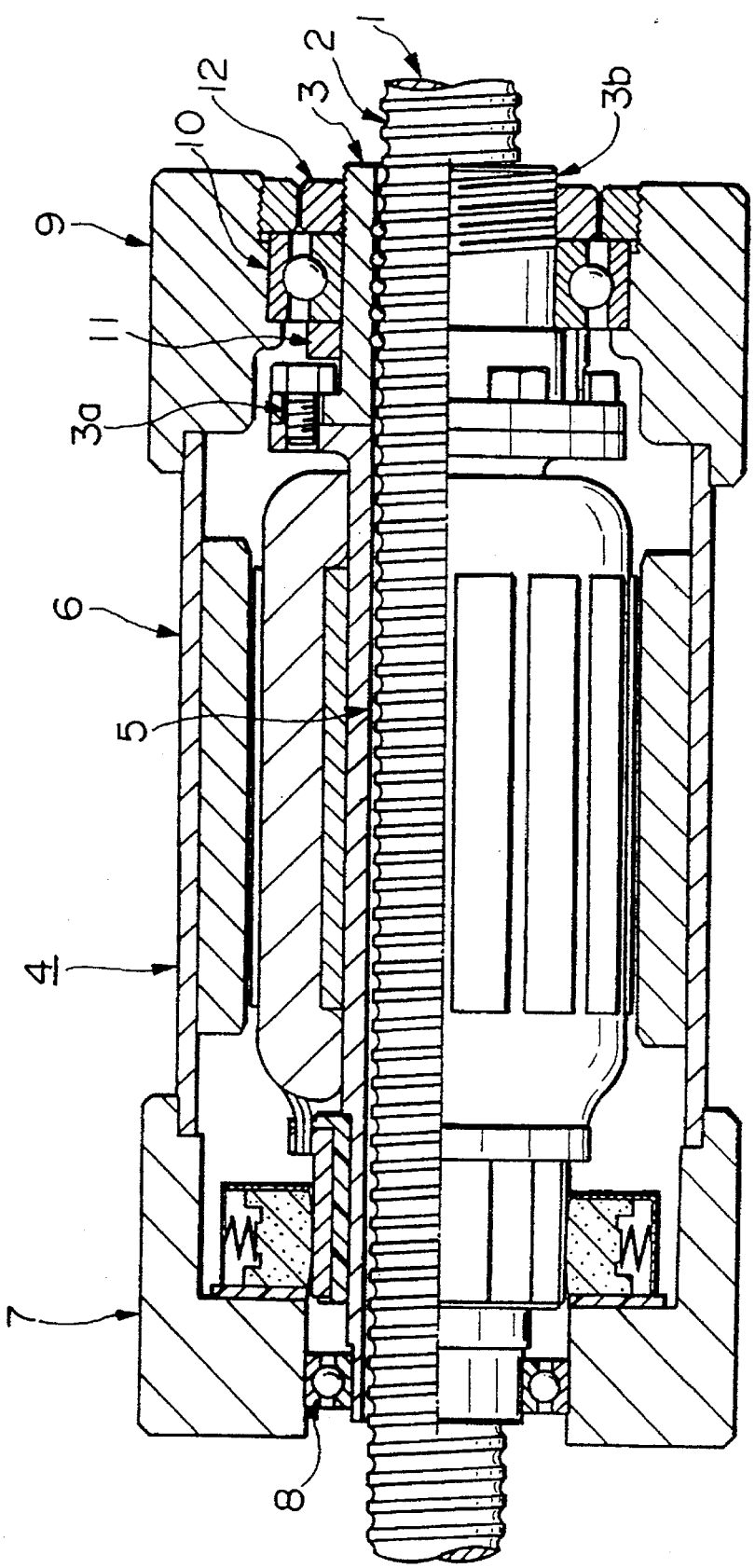
FIG. 4 is an example of a motor rotation shaft according to a conventional design of the support structure.

Each end of the rack member 1 shown in FIG. 3 is connected to a respective tie rod connected to a knuckle for rotatably supporting a wheel. Screw threads 2 are provided on a part of the outer surface of the rack member 1 for threading engagement with the ball screw nut.

Figure 2:
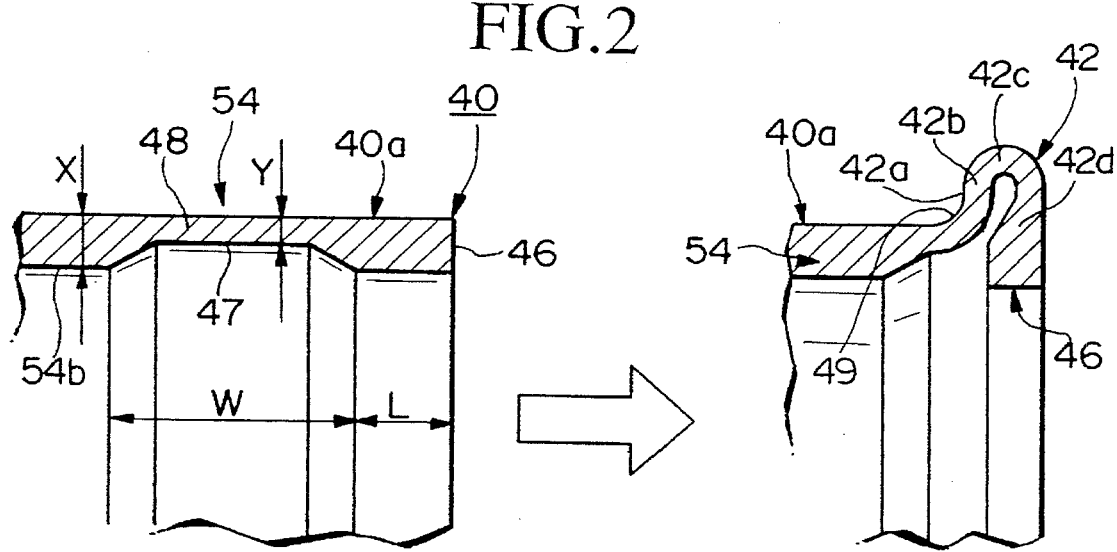
FIG. 2 is an illustration of an example of making a flange section according to the manufacturing process of the present invention.

The steering assembly presented above is operated by supplying electrical current to the drive motor 30 so as to rotate the ball screw nut as a unit with the motor rotation shaft 40 of the drive motor 30, causing reciprocating actions of the rack member 1, to left or right in FIG. 1, to alter the direction of travel of the automobile.

As shown enlarged in FIG. 1, the end assembly comprises the associated shaft bearing 38 and a spacer 43 for the motor rotation shaft 40 provided with an integrally formed flange section 42 of a U-shaped cross section protruding from the entire outer surface 40a thereof extending towards the outer radial direction.

The flange section 42, as shown in FIG. 2, includes: an inside vertical wall 42b; an arcuate section 42c bent in a semicircular shape and contiguous with the inside vertical wall 42b; and an outside vertical wall 42d extending contiguously with the arcuate section 42c towards the inner radial direction. The inside diameter of the edge surface 46 of the flange section 42 is either the same as or larger than the inside diameter of other general parts of the motor rotation shaft 40. The outer surface of the inside vertical wall 42b is the side surface 42a, and includes a transition section 49 forming a gradual curvature joining the side surface 42a with the outer surface 40a.

A ring-shaped spacer (i.e. the stopper member) 43 abuts the side surface 42a of the inside vertical wall 42b and the transition section 49. The inner peripheral section 43a of the spacer 43 abutting the flange section 42 is bevelled broadly (with a radius of curvature R) so as to make a close contact with the transition section 49. The inner race 51a of the shaft bearing 38 is clamped by the spacer 43 and a C-clip (a positioning member) 45. The C-clip 45 is engaged in a circumferential groove 44 formed on the outer surface 40a of the motor rotation shaft 40. This configuration assures that the motor rotation shaft 40 does not exhibit displacement in the axial direction with respect to the shaft bearing 38.

The outer race 51b of the shaft bearing 38 is fixed in place with a ring-shaped retainer 36a attached to the housing 37 with bolts 53.

A method of fabricating the flange section 42 will be explained with reference to FIG. 2.

As shown in FIG. 2, a groove 47 having a width W is fabricated on the inner end surface 54b at a distance L from the edge surface 46, measured in the axial direction of a cylindrical starting material 54 for making the motor rotation shaft 40. The groove 47 forms a part of the thin-walled section 48 having a wall thickness thinner than other general parts of the motor rotation shaft 40.

Next, the cylindrical starting material 54 is compressed in the axial direction. By so doing, the thin-walled section 48 collapses over the entire circumference and protrudes out towards the outer radial direction, thus readily forming a flange section 42 having a U-shaped cross section. Here, by first assembling the shaft bearing 38, spacer 43 and C-clip 45 on the cylindrical starting material 54, and then compressing the cylindrical starting material 54 in the axial direction, the flange section 43 is formed in the outer radial direction while being guided by the spacer 43. The transition section 49 is also formed while the inner peripheral section 43a of the spacer 43 is in close contact therewith. Because the inner peripheral section 43a is bevelled broadly, the compressive force in the axial direction of the cylindrical part is smoothly transferred in the radial direction to produce a protruded shape of the thin-walled section 48. This method of fabrication assures that the outer surface of the thin-walled section 48 is not subjected to undue stresses, and that the spacer 43 would not produce mechanical damage on the outer surface.

A design criterion used in this embodiment is $Y \leq X-Y$ where X is the wall thickness of general parts of the motor rotation shaft 40 and Y is the thickness of the thin-walled section 48 to ensure that the thin-walled section 48 is readily deformed in the outer radial direction when the cylindrical starting material 54 is compressed in the axial direction.

Next, explanations will be provided for the effects and benefits of including the support structure for the motor rotation shaft 40 of this embodiment in a steering assembly, and for the beneficial features of the method of making the support structure.

When an axial force is applied on the motor rotation shaft 40 by way of the rack member 1 and the ball screw nut, the inside vertical wall 42b of the flange section 42 in contact with the spacer 43 tries to bend by springing back. However, the displacement of the inside vertical wall 42b is prevented from occurring by the presence of the arcuate section 42c and the outside vertical wall 42d. Therefore, the inside vertical wall 42b is not able to bend by spring back, and retains the original as-fabricated form. The method of plastic forming the inside vertical wall 42b provides strengthening of the inside vertical wall 42c, by working hardening produced by folding bend required in making the arcuate section 42c. Therefore, even if a large axial force is applied to the motor rotation shaft 40 and the inside vertical wall 42b is subjected to the axial force, the inside vertical wall 42 does not undergo deformation readily.

In manufacturing the support device for the motor rotation shaft 40, the wall thickness of the edge surface 46 of the motor rotation shaft 40 is made to be the same as the general wall thickness X, therefore, there is no cracks produced in forming the flange section 42 according to the procedure described above. Further, after the formation of the flange section 42, the inside diameter of the edge surface 46 is the made to the same as or larger than other parts of the motor rotation shaft 40, therefore, there is no effect of the edge surface 46 on the performance of the rack member 1. Whether the inside diameter of the edge surface 46 is to be made the same as or larger than other parts of the motor rotation shaft 40 is determined by the hardness of the starting material, the ratio of the specific distance L and width W, the wall thickness X of the thin-walled section 48 and fabrication conditions.

As explained above, the flange section 42 provided on the motor rotation shaft 40 is made in a precise shape to provide a close contact of the spacer 43 against the side surface 42a of the inside vertical wall 42b of the flange section 42, thus tightly clamping the inner race 51a of the shaft bearing 38. Further, because the flange section 42 has a high hardness, the flange section 42 does not deform to generate a slack even if a large external force acts on the motor rotation shaft 40 in the axial direction.

This embodiment was based on the flange section 42 of a U-shaped cross section provided on the end of the motor rotation shaft 40. However, the present invention of the support device is not limited to this configuration. It is permissible to provide the U-shaped flange section in an axial center section of the motor rotation shaft 40 or a part other than a shaft bearing can be fixed to the hollow shaft to produce the U-shaped flange section.

Also, the design criterion of the thickness of the thin-walled section 48 is an example of a preferred embodiment, and it is obvious that the exact values and their relationship would depend on the type of materials used to make the shaft and their fabrication methods. It is clear that a similar folding bend can be produced by providing some thin-walled section of other dimensional relationship to the remaining section of the motor rotation shaft.

What is claimed is:

1. A support structure for freely rotatably supporting a motor rotation shaft in a power steering unit comprising: a hollow cylindrical motor rotation shaft; a flange section having a U-shaped cross section protruding outward radially, and integrally formed as an end assembly of said motor rotation shaft; and a shaft bearing for freely rotatably supporting said motor rotation shaft; wherein said flange section engages with said motor rotation shaft so as to prevent an axial displacement of said motor rotation shaft with respect to said shaft bearing.

2. A support structure as claimed in claim 1, wherein diameter of said flange section gradually increases along the axial direction of said shaft bearing.

3. A support structure as claimed in claim 2, wherein a mating interface of said spacer with said flange section is provided with a broadly bevelled surface, and said flange section is provided with a transition section having a gradually curving surface to mate closely with said broadly bevelled surface.

4. A support structure as claimed in claim 1, wherein said flange section engages with said motor rotation shaft in association with a positioning means, including ring-shaped spacer and a C-clip, so as to clamp each shaft bearing provided in each end assembly of said motor rotation shaft so as to prevent said axial displacement of said motor rotation shaft.

5. A support structure as claimed in claim 1, wherein a mating interface of said spacer with said flange section is provided with a broadly bevelled surface, and said flange section is provided with a transition section having a gradually curving surface to mate closely with said broadly bevelled surface.

6. A support structure as claimed in claim 1, wherein said flange section formed near said end assembly of said motor rotation shaft is provided at its outwardmost portion with a wall thickness equal to a wall thickness of an elongated portion of said motor rotation shaft.

7. A support structure as claimed in claim 1, wherein said flange section formed in said end assembly of said motor rotation shaft is provided at its outwardmost portion with an inside diameter equal to an inside diameter of an elongated portion of said motor rotation shaft.

8. A support structure as claimed in claim 1, wherein said flange section formed in said end assembly of said motor rotation shaft is provided at its outwardmost portion with an inside diameter larger than an inside diameter of an elongated portion of said motor rotation shaft.

9. A support structure as claimed in claim 1, wherein said flange section engages with said motor rotation shaft in association with a ring-shaped spacer abutting said shaft bearing provided in said end assembly so as to prevent said axial displacement of said motor rotation shaft.

* * * * *

UNITED STATES PATENT AND TRADEMARK OFFICE
CERTIFICATE OF CORRECTION

PATENT NO.   :   5,505,547
DATED        :   April 9, 1996
INVENTOR(S)  :   Tadao KODAIRA It is certified that error appears in the above-indentified patent and that said Letters Patent is hereby corrected as shown below:

Title page, [73] Assignee: Change "Mutsuba Electric Mgf. Co., Ltd., Kiryu, Japan" to --Mitsuba Electric Mfg. Co., Ltd., Kiryu, Japan --.

Signed and Sealed this

Thirtieth Day of December, 1997

Attest:

BRUCE LEHMAN

*Attesting Officer*     *Commissioner of Patents and Trademarks*